United States Patent

Kotake et al.

[11] Patent Number: 5,261,707
[45] Date of Patent: Nov. 16, 1993

[54] JOINT FOR CONNECTION OF A CORRUGATED PIPE

[75] Inventors: Naoyuki Kotake; Takeya Sasa; Reichi Makishima; Yoshikazu Kobayashi, all of Tokyo, Japan

[73] Assignee: Nitto Kohki Co., Ltd., Tokyo, Japan

[21] Appl. No.: 986,541

[22] Filed: Dec. 7, 1992

[51] Int. Cl.⁵ .............................. F16L 37/08
[52] U.S. Cl. ...................... 285/308; 285/319; 285/322; 285/903
[58] Field of Search ............ 285/308, 319, 320, 318, 285/903, 322

[56] References Cited

U.S. PATENT DOCUMENTS

| | | |
|---|---|---|
| 2,129,704 | 9/1938 | Meyer . |
| 3,934,902 | 1/1976 | McNamee . |
| 4,046,451 | 9/1977 | Juds et al. .............. 285/903 X |
| 4,606,564 | 8/1986 | Kurachi . |
| 4,904,002 | 2/1990 | Sasa et al. .............. 285/903 X |
| 4,951,975 | 8/1990 | Bartholomew .......... 285/308 X |
| 5,042,844 | 8/1991 | Iida et al. ............... 285/903 X |
| 5,080,405 | 1/1992 | Sasa et al. . |

FOREIGN PATENT DOCUMENTS

| | | |
|---|---|---|
| 3710853 | 10/1988 | Fed. Rep. of Germany ...... 285/319 |
| 3924173 | 1/1991 | Fed. Rep. of Germany ...... 285/319 |

Primary Examiner—Dave W. Arola
Attorney, Agent, or Firm—Wenderoth, Lind & Ponack

[57] ABSTRACT

A joint for connecting a corrugated pipe to another member includes a cylindrical body having an annular step portion formed in its inner part and adapted to be brought into contact with a front end of a corrugated pipe; a chuck having an annular body which includes a forward end part of an inner diameter substantially equal to or slightly smaller than an outer diameter of the corrugated pipe and which exhibits elasticity by which the chuck can contract and expand in radially inner and outer directions, an engaging portion formed on an inner periphery of its forward end part for engaging an outer periphery of the corrugated pipe, and a locking portion formed on an inner periphery of its rearward end part, the chuck being engaged with the outer periphery of the corrugated pipe in the cylindrical body so as to be capable of moving the corrugated pipe into the cylindrical body integrally with the chuck; and a push cylinder having a counterpart locking portion formed on an outer periphery of its forward end part and adapted to be locked to the locking portion formed on the rearward end part of the chuck, the push cylinder being slidably fitted to an inner periphery of an end portion of the cylindrical body, the push cylinder being for pushing the chuck into the cylindrical body when the push cylinder is advanced.

1 Claim, 2 Drawing Sheets

JOINT FOR CONNECTION OF A CORRUGATED PIPE

BACKGROUND OF THE INVENTION

This invention relates to a joint for connecting a corrugated pipe to another member.

A conventional joint for connecting a corrugated pipe to another member comprises a cylindrical body having an enlarged through-hole and a reduced through-hole formed at its end portion and its inner part, respectively, an annular step portion formed between the enlarged through-hole and the reduced through-hole to be brought into contact with a front end of the corrugated pipe, an engaging member fitted to an inner periphery of the cylindrical body defining the enlarged through-hole, engaged with an outer periphery of the corrugated pipe, and allowed to contract and expand in radially inward and outward directions, and a cylindrical locking member screwed into an inner periphery of an end portion of the cylindrical body defining the enlarged through-hole.

The cylindrical locking member screwed into the cylindrical body is turned and tightly fastened to contract the engaging member radially inward. The engaging member is engaged with an outer peripheral groove of the corrugated pipe inserted into the cylindrical body so that the corrugated pipe is locked. The engagement member is forced inwardly to thereby move the corrugated pipe in the same direction. The front end of the corrugated pipe is brought into contact with the annular step portion of the cylindrical body and is plastically deformed to effect sealing.

In the above-mentioned conventional joint, the corrugated pipe is connected by turning the cylindrical locking member. Accordingly, the connecting operation is troublesome and time-consuming. In addition, cutting dust is often produced because the cylindrical locking member may be loosened due to an external impact or other reasons. In this event, the sealing of the corrugated pipe becomes insufficient or the corrugated pipe is disconnected. Therefore, it is necessary to provide means for preventing the cylindrical locking member from being loosened. This results in a complicated structure.

SUMMARY OF THE INVENTION

It is an object of this invention to provide a joint for connection of a corrugated pipe, which is capable of easily connecting the corrugated pipe in a short time, assuring tight sealing and locking of the corrugated pipe, and which has a simple structure so as to facilitate the manufacture and to keep costs low.

In accordance with this invention, there is provided a joint which comprises a cylindrical body having an annular step portion formed in its inner part and adapted to be brought into contact with a front end of a corrugated pipe. A chuck comprises an annular body which has a forward end part of an inner diameter substantially equal to or slightly smaller than an outer diameter of the corrugated pipe and which is allowed to contract and expand in radially inward and outward directions, the chuck exhibiting elasticity by which the chuck can restore itself in the radially inward direction.

The chuck has an engaging portion formed on an inner periphery of its forward end part for engaging an outer periphery of the corrugated pipe. The chuck also has a locking portion formed on an inner periphery of its rearward end part. The chuck is engaged with the outer periphery of the corrugated pipe in the cylindrical body so as to move the corrugated pipe towards the inner part of the cylindrical body integrally with the chuck. A push cylinder has a counterpart locking portion formed on an outer periphery of its forward end part and locked to the locking portion formed on the rearward end part of the chuck. The push cylinder is slidably fitted to an inner periphery of an end portion of the cylindrical body. The push cylinder is for pushing the chuck into the cylindrical body when the push cylinder is advanced. The cylindrical body comprises a chuck coupling portion formed in the vicinity of the annular step portion for coupling the chuck to prevent the chuck from being expanded in the radially outward direction. A holding portion is formed in the end portion of the cylindrical body for slidably receiving the rearward end part of the chuck and the push cylinder. A chuck escape portion of an enlarged diameter is formed between the chuck coupling portion and the holding portion to allow for an expansion of the chuck. A stopper step portion is formed between the chuck escape portion and the holding portion to lock a rear end of the chuck expanded in the chuck escape portion.

The chuck and the push cylinder are fitted in the holding portion of the cylindrical body and located at a predetermined position while the locking portion formed on the rearward end part of the chuck and the counterpart locking portion formed on the forward end part of the push cylinder are locked to each other. In this state, the corrugated pipe is inserted into the cylindrical body. An outer peripheral ridge of the corrugated pipe forces the forward end part of the chuck located in the chuck escape portion to expand in the radially outward direction. When an outer peripheral groove of the corrugated pipe reaches a position below the engaging portion formed on the inner periphery of the forward end part of the chuck, the forward end part of the chuck, which has been expanded, contracts radially inwardly. The engaging portion is received within the groove of the corrugated pipe. When the push cylinder is inserted into the cylindrical body, the chuck is forced by the push cylinder to move further into the cylindrical body. With the movement of the chuck, the corrugated pipe is moved also in the same direction integrally with the chuck.

When the chuck is forced by the push cylinder to move, the forward end part of the chuck is received in the chuck coupling portion formed in the cylindrical body to prevent expansion of the forward end part of the chuck. The engaging portion formed on the forward end part of the chuck is brought into pressing contact with the corrugated pipe and is engaged with the corrugated pipe to prevent the removal of the corrugated pipe. When the push cylinder is further inserted, the chuck is further moved in the same direction. Simultaneously, the corrugated pipe is moved also in the same direction because the outer periphery of the corrugated pipe is engaged with the engaging portion of the chuck. Finally, the top end of the corrugated pipe is brought into contact with the annular step portion formed in the inner part of the cylindrical body and is plastically deformed to be press-bonded to the annular step portion. The push cylinder is so inserted until the chuck reaches the above-mentioned state. When the rearward end part of the chuck reaches the chuck escape portion formed in the cylindrical body, the rearward end part of the chuck pushed by the push cylinder is expanded in the chuck escape portion in the radially outward direction. A rearmost end of the expanded rearward end part is locked by the locking step portion formed between the chuck escape portion and the holding portion to prevent the chuck from being retracted towards the end portion of the cylindrical body.

DETAILED DESCRIPTION OF THE PREFERRED EMBODIMENT

Figure 1:
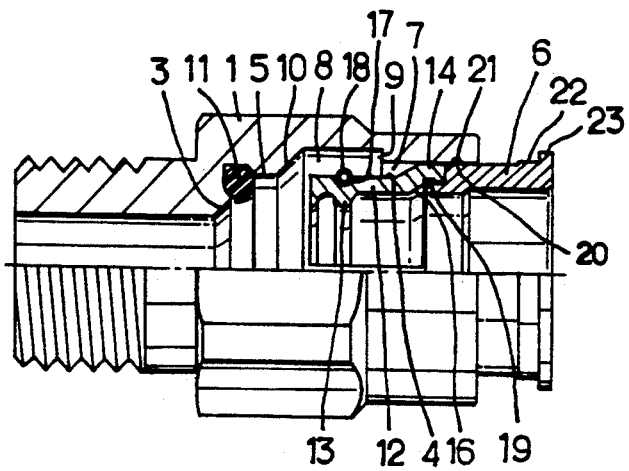
FIG. 1 is a partial sectional view of an embodiment of this invention.

A cylindrical body 1 is for receiving a corrugated pipe 2. An annular step portion 3 is formed in an inner part of the cylindrical body 1 to be brought into contact with a front end of the corrugated pipe 2 inserted into the cylindrical body 1. In the cylindrical body 1, a chuck coupling portion 5 is formed in the vicinity of the annular step portion 3. The chuck coupling portion 5 is for receiving a forward end part of a chuck 4, which will later be described, to prevent expansion of the forward end part of the chuck 4 in a radially outward direction. The cylindrical body 1 is provided at an end thereof with a holding portion 7 for slidably receiving and holding a rearward end part of the chuck 4 and a push cylinder 6 which also will be described later. A chuck escape portion 8 having a diameter larger than that of the holding portion 7 is formed between the chuck coupling portion 5 and the holding portion 7 to allow for expansion of the chuck 4.

Between the chuck escape portion 8 and the holding portion 7, a locking step portion 9 is formed. The locking step portion 9 is for locking a rear end of the chuck 4 expanded in the chuck escape portion 8 to prevent the chuck 4 from being removed from the cylindrical body 1. A tapered step portion 10 is formed between the chuck coupling portion 5 and the chuck escape portion 8 to guide the forward end part of the chuck 4 towards a center axis of the cylindrical body 1 in order to help fit the forward end part of the chuck 4 into the chuck coupling portion 5. A seal ring 11 is interposed between the annular step portion 3 and the chuck coupling portion 5 to seal an outer periphery of the top end of the corrugated pipe 2 thus inserted.

Next, the chuck 4 will be described.

The chuck 4 is engaged with the outer periphery of the corrugated pipe 2 in the cylindrical body 1 so that the corrugated pipe 2 will move towards the inner part of the cylindrical body 1 integrally with the chuck 4. The chuck 4 comprises an annular body which has a forward end part 12 of an inner diameter substantially equal to or slightly larger than an outer diameter of the corrugated pipe 2 and which is allowed to contract and expand in radially inward and outward directions. The chuck 4 has elasticity by which it can return to its normal state by contracting in a radially inward direction. An engaging portion 13 is formed on an inner periphery of the forward end part 12 and comprises a ridge and a groove similar in shape to outer grooves and outer ridges of the corrugated pipe 2. A locking portion 15 is formed on an inner periphery of the rearward end part 14 and comprises a rib and a recess 27 inwardly adjacent to the rib. The outer and the inner diameters of the forward end part 12 of the chuck 4 are smaller than the outer and the inner diameters of the rearward end part 14 of the chuck 4, respectively. When the chuck 4 is contracted, the outer diameter of the forward end part 12 is reduced to allow the forward end part 12 to be fitted into the chuck coupling portion 5. A frustoconical surface 16 is formed between the forward end part 12 and the rearward end part 14. The frustoconical surface 16 has a diameter which becomes smaller towards the forward end part 12.

Figure 5:
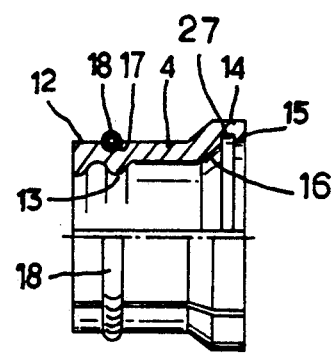
FIG. 5 is a partial sectional view of the chuck illustrated in FIG. 1.

In this embodiment, the chuck 4 is divided into three portions along an axial direction as illustrated in FIG. 5. A groove 17 is formed in the outer periphery of the forward end part of the chuck 4. An elastic ring 18 is mounted in the groove 17 and allows the chuck 4 to expand and contract in the radially outward and inward directions. The elastic ring 18 serves to bias the chuck 4 in the radially inward direction.

The push cylinder 6 for inserting the chuck 4 will now be described.

The push cylinder 6 comprises a cylindrical body made of synthetic resin having such an outer diameter that the push cylinder 6 can be slidably received in the holding portion 7 and an inner diameter which allows the corrugated pipe 2 to be inserted therein. The push cylinder 6 has a counterpart locking portion 19 formed at the outer periphery of its forward end part. The counterpart locking portion 19 comprises a rib and a recess inwardly adjacent to the rib which are to be engaged with the rearward end part 14 of the chuck 4. The counterpart locking portion 19 is removably locked to the locking portion 15 formed on the inner periphery of the rearward end part 14 of the chuck 4 with the rib of locking portion 14 being received in a recess 29 of the end part 14. An annular protrusion 20 of a small height is formed on the outer periphery of the forward end part of the push cylinder 6. On the other hand, an annular groove 21 for receiving the annular protrusion 20 is formed at an inner periphery of the end portion of the cylindrical body 1, namely, at the holding portion 7. When the push cylinder 6 is inserted into the holding portion 7 and the annular protrusion 20 is received in the annular groove 21, the push cylinder 6 is located at a connection-standby position in the holding portion 7. The push cylinder 6 is held at that position so as not to be readily moved therefrom. An enlarged portion 7 is formed at the outer periphery of the rearward end part of the push cylinder 6. A flange 23 is formed at a rearmost end of the push cylinder 6.

Next, the manner in which the corrugated pipe is secured to the joint according to the present invention will be described.

In a non-connection state, the rearward end part 14 of the chuck 4 and the push cylinder 6 are fitted in the holding portion 7 positioned at the inner periphery of the end portion of the cylindrical body 1 while the locking portion 15 at the rearward end part 14 of the chuck 4 and the counterpart locking portion 19 at the forward end part of the push cylinder 6 are locked to each other. The annular protrusion 20 of the push cylinder 6 is received in the annular groove 21 of the holding portion 7. In this state, the rearward end part 14 of the chuck 4 is prevented from expanding and is held in a contracted state. The locking portion 15 at the rearward end part 14 of the chuck 4 is kept locked to the counterpart locking portion 19 at the forward end part of the push cylinder 6. The forward end part 12 of the chuck 4 is located in the chuck escape portion 8 and is kept by the elastic ring 18 in a contracted state. The above-mentioned state is a connection-standby state for the corrugated pipe 2 (FIG. 1).

Figure 2:
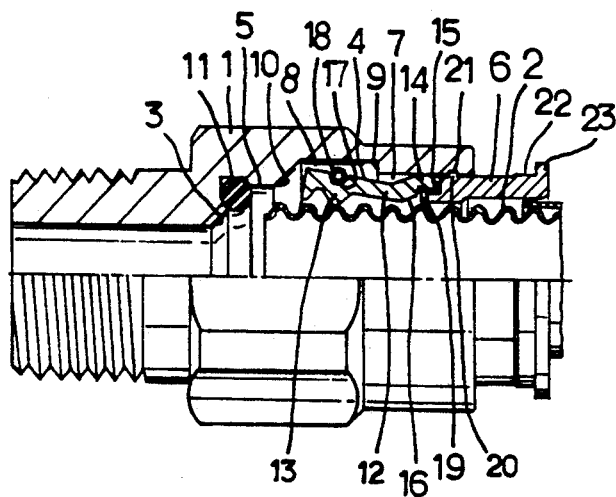
FIG. 2 is a partial sectional view illustrating a state in which a corrugated pipe is being inserted in a cylindrical body.

When the corrugated pipe 2 is inserted in the cylindrical body 1 illustrated in FIG. 1, the engaging portion 13 at the forward end part 12 of the chuck 4, which has been contracted by the elastic ring 18, is expanded by the outer ridge of the corrugated pipe 2 in the radially outward direction. The forward end part 12 of the chuck 4 is expanded against the elasticity of the elastic ring 18 with the locking portion 15 at the rearward end part 14 serving as a fulcrum. Thus, the corrugated pipe 2 is allowed to advance (FIG. 2).

Figure 3:
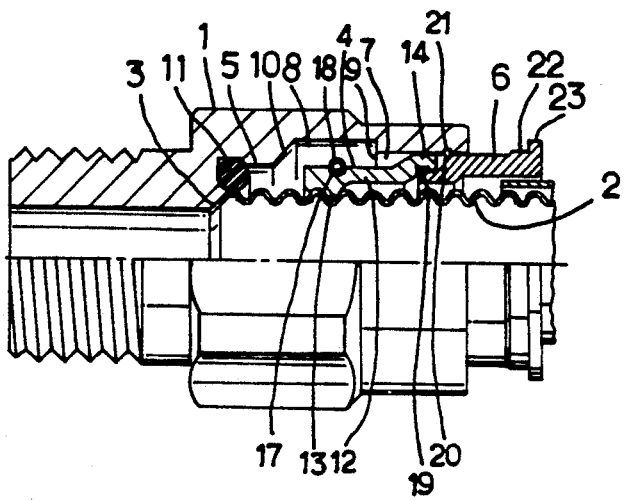
FIG. 3 is a partial sectional view illustrating a state in which a forward end part of a chuck is engaged with an outer periphery of the corrugated pipe.

Insertion of the corrugated pipe 2 is stopped when the periphery of the forward end of the corrugated pipe 2 is brought into contact with the seal ring 11 located in the cylindrical body 1. The push cylinder 6 is forced into the holding portion 7 by the use of an appropriate jig (FIG. 3).

When the push cylinder 6 is inserted, the chuck 4 is pushed to move inwardly of the cylindrical body 1. When the engaging portion 13 formed on the inner periphery of the forward end part 12 of the chuck 4 is coincident with the outer groove of the corrugated pipe 2, the forward end part 12 of the chuck 4 is contracted by the elastic ring 18 in the radially inward direction. The engaging portion 13 is received within the groove of the corrugated pipe 2. Accordingly, the corrugated pipe 2 is moved with the movement of the chuck 4 integrally with the chuck 4.

Pushed by the push cylinder 6, the chuck 4 is moved with the corrugated pipe 2 towards the inner part of the cylindrical body 1. The forward end part 12 is guided towards the center axis by the tapered step portion 10 between the chuck coupling portion 5 and the chuck escape portion 8, and is fitted into the chuck coupling portion 5. As a result, expansion of the forward end part 12 of the chuck 4 is prevented by the chuck coupling portion. The engaging portion 13 of the forward end part 12 of the chuck 4 is brought into pressing contact with the outer periphery of the corrugated pipe 2 to prevent the removal of the corrugated pipe 2.

When the chuck 4 is moved, the corrugated pipe 2 is also moved integrally with the chuck 4, removal of the corrugated pipe 2 from the chuck 4 being prevented. The forward end of the corrugated pipe 2 is brought into contact with the annular step portion 3 formed in the inner part of the cylindrical body 1. The forward end is plastically deformed and press-bonded to the annular step portion 3 so as to create a seal. When the chuck 4 is advanced until the above-mentioned state is reached, the rearward end part 14 of the chuck 4 is released from the holding portion 7 and enters the chuck escape portion 8. Expansion of the rearward end part 14 is no longer prevented by the holding portion 7. When the push cylinder 6 is further inserted, the rearward end part 14 of the chuck 4 is forced, by the forward end part of the push cylinder 6, to expand in the radially outward direction. This is because the top end of the corrugated pipe 2 is already brought into contact with the annular step portion 3 to inhibit further movement of the chuck 4. The rearmost end of the rearward end part 14 thus expanded is locked by the locking step portion 9 formed between the chuck escape portion 8 and the holding portion 7. The chuck 4 is then prevented from retracting, namely, from being pulled out towards the end portion of the cylindrical body 1. Thus, connection of the corrugated pipe 2 is completed.

Figure 4:
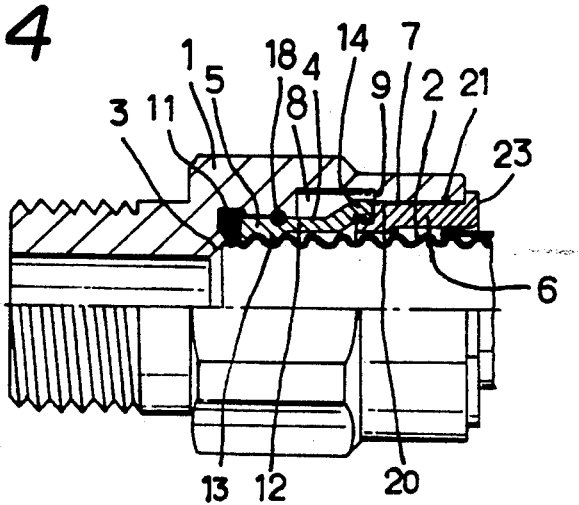
FIG. 4 is a partial sectional view illustrating a state in which the corrugated pipe is connected.

The push cylinder 6 inserted into the holding portion 7 is not easily removed from the holding portion 7 because the enlarged step portion 22 formed on the outer periphery is press-fitted to the holding portion 7. As a result, the rearward end part 14 of the chuck 4, which is forced by the forward end part of the push cylinder 6 to expand in the chuck escape portion 8, is prevented by the forward end part of the push cylinder 6 from contracting. Thus, the rearmost end of the rearward end part 14 of the chuck 4 is maintained in a locked state with the locking step portion 9. Thus, the complete connection of the corrugated pipe 2 is assured (FIG. 4).

In the foregoing embodiment, the push cylinder 6 is made of synthetic resin. However, the push cylinder 6 may be made of another appropriate material. The chuck 4 may be divided into two or four or more portions along the axial direction although the chuck 4 is divided into three portions in the foregoing embodiment.

Figure 6:
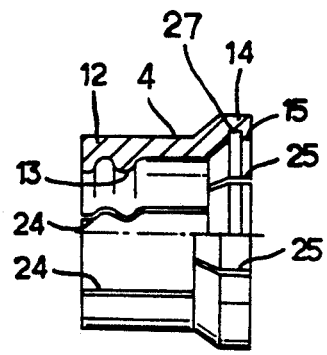
FIG. 6 is a partial sectional view of another embodiment of the chuck illustrated in FIG. 1.

FIG. 6 shows a chuck 4 of synthetic resin according to another embodiment of this invention. The chuck 4 is not divided along the axial direction. The forward end part 12 and the rearward end part 14 are provided with slits 24 and 25, respectively, so that the forward end part 12 and the rearward end part 14 can expand and contract in radially outward and radially inward directions. Similar parts are designated by like reference numerals as in the foregoing embodiment.

According to this invention, the chuck for engaging the outer periphery of the corrugated pipe to lock the corrugated pipe in the cylindrical body is prevented by the chuck coupling portion from being expanded. In this connection, the outer periphery of the corrugated pipe is reliably locked. The rearmost end of the chuck is locked by the locking step portion so as to be prevented from being retracted. Accordingly, it is possible to obtain a great pull load of the corrugated pipe and to assure complete connection and complete sealing. Connection of the corrugated pipe is carried out by a simple operation of pushing the push cylinder. As compared with the conventional connection carried out by revolving a nut, this operation is very simple and is completed in a short time without producing cutting dust. In addition, the structure is very simple so that manufacture is facilitated and costs are low.

What is claimed is:

1. A joint for connecting a corrugated pipe to another member, said joint comprising:
a generally cylindrical body including an internal stepped portion defining an annular surface to contact a leading end of a corrugated pipe inserted in the cylindrical body, a chuck coupling portion defining an inner peripheral surface of the cylindrical body in the vicinity of said stepped portion, a holding portion defining an inner peripheral surface of the cylindrical body at an end of the body, a chuck escape portion between said chuck coupling portion and said holding portion, the chuck escape portion defining an inner peripheral surface of the cylindrical body having a diameter larger than that of each said inner peripheral surface defined by said chuck coupling and said chuck holding portions such that the cylindrical body has another inner annular surface of an internal stepped portion located between said chuck escape portion and said holding portion;

an annular chuck received within said cylindrical body, said chuck exhibiting sufficient elasticity to allow the chuck to be expanded and contracted in radially outward and radially inward directions, and said chuck having a front end, an engagement at an inner periphery of said front end and which engagement is configured to engage an outer peripheral portion of a corrugated pipe inserted within the chuck, a rear end, and a locking part at an inner periphery of said rear end, the front end of said chuck having an outer diameter close to that of the diameter of the surface defined by said chuck coupling portion of the cylindrical body such that the front end of the chuck is prevented from expanding outwardly when located in said chuck coupling portion, and the rear end of said chuck having an outer diameter close to that of the surface defined by said holding portion of the cylindrical body such that the rear end of the chuck is slidable along the surface defined by said holding portion and can expand into said chuck escape portion after having been moved off of the holding portion and into the escape portion; and a push cylinder received in said end of the cylindrical body, said push cylinder including a forward end, a counterpart locking portion at an outer periphery of said forward end and which counterpart locking portion is locked to said locking part of the chuck such that axial movement of said push cylinder into said cylindrical body would cause said chuck to be pushed into the cylindrical body, said push cylinder having such a length that the rear end of said chuck is located against said another inner annular surface of the internal stepped portion located between said chuck escape portion and said holding portion of the cylindrical body and said front end of said chuck is positioned in said chuck coupling portion when the push cylinder has been pushed into the cylinder to a complete insertion position wherein the chuck is prevented by engagement of said rear end of said chuck with said another inner annular surface from being retracted from said chuck coupling portion.

* * * * *